United States Patent
Daniel

(10) Patent No.: US 9,372,969 B1
(45) Date of Patent: Jun. 21, 2016

(54) PORTABLE CHECK TRANSACTION MANAGER DEVICE, SYSTEM AND METHOD

(75) Inventor: Isaac S. Daniel, Miami, FL (US)

(73) Assignee: Lead Technology Capital Management, LLC

( * ) Notice: Subject to any disclaimer, the term of this patent is extended or adjusted under 35 U.S.C. 154(b) by 902 days.

(21) Appl. No.: 12/690,611

(22) Filed: Jan. 20, 2010

Related U.S. Application Data

(63) Continuation-in-part of application No. 29/315,925, filed on Aug. 6, 2009, now Pat. No. Des. 613,738.

(51) Int. Cl.
| | |
|---|---|
| G06F 21/30 | (2013.01) |
| G06F 21/32 | (2013.01) |
| G06Q 20/32 | (2012.01) |
| B43K 29/00 | (2006.01) |

(52) U.S. Cl.
CPC .............. *G06F 21/30* (2013.01); *B43K 29/00* (2013.01); *G06F 21/32* (2013.01); *G06Q 20/3221* (2013.01)

(58) Field of Classification Search
CPC ...................................................... G06F 21/30
See application file for complete search history.

(56) References Cited

U.S. PATENT DOCUMENTS

| | | | | |
|---|---|---|---|---|
| 5,405,024 | A * | 4/1995 | Sahf ............................. | 211/69.5 |
| D364,641 | S * | 11/1995 | Osterhout ..................... | D19/36 |
| 5,657,459 | A * | 8/1997 | Yanagisawa et al. .... | 361/679.21 |
| 5,737,740 | A * | 4/1998 | Henderson et al. ........... | 715/210 |
| D408,853 | S * | 4/1999 | Hornsby et al. .............. | D19/36 |
| 6,104,603 | A * | 8/2000 | Wang ........................ | 361/679.09 |
| 6,111,565 | A | 8/2000 | Chery et al. | |
| 6,130,666 | A * | 10/2000 | Persidsky ....................... | 345/179 |
| 6,364,184 | B1 * | 4/2002 | Hauck et al. .................. | 224/271 |
| 6,396,481 | B1 * | 5/2002 | Challa et al. .................. | 345/169 |
| 6,486,875 | B1 * | 11/2002 | O'Donnell, Jr. ............. | 345/179 |
| 6,666,564 | B1 * | 12/2003 | Su ................................. | 362/118 |
| 6,776,332 | B2 | 8/2004 | Allen et al. | |
| 6,952,497 | B1 * | 10/2005 | Hollstrom et al. ............ | 382/188 |
| 7,086,798 | B1 | 8/2006 | Cetera | |
| 7,185,805 | B1 * | 3/2007 | McShirley ..................... | 235/379 |
| 7,258,267 | B2 * | 8/2007 | Choi ............................. | 235/379 |
| D613,738 | S * | 4/2010 | Daniel ......................... | D14/346 |
| 7,929,736 | B2 | 4/2011 | Bechtel | |
| 2001/0007983 | A1 * | 7/2001 | Lee ................................ | 705/69 |
| 2001/0025289 | A1 * | 9/2001 | Jenkins et al. ................ | 708/141 |
| 2001/0055411 | A1 * | 12/2001 | Black ............................ | 382/124 |
| 2002/0026575 | A1 * | 2/2002 | Wheeler et al. .............. | 713/156 |
| 2002/0063799 | A1 * | 5/2002 | Ortiz et al. .................... | 348/559 |
| 2002/0067854 | A1 * | 6/2002 | Reintjes et al. ............... | 382/199 |
| 2002/0072953 | A1 * | 6/2002 | Michlowitz et al. ........... | 705/10 |
| 2002/0082995 | A1 * | 6/2002 | Christie, IV .................... | 705/44 |
| 2002/0099683 | A1 * | 7/2002 | Sloan et al. ...................... | 707/1 |

(Continued)

FOREIGN PATENT DOCUMENTS

| | | | | |
|---|---|---|---|---|
| EP | 1544819 A2 * | 6/2005 | ............. | G07F 19/00 |
| WO | WO 2004/059586 | 7/2004 | | |

*Primary Examiner* — Jacob C. Coppola
(74) *Attorney, Agent, or Firm* — Carol N. Green Kaul, Esq.

(57) ABSTRACT

The present invention is directed to an apparatus, system and method for managing bank transactions, configured for communicating with a depositor's account at a banking institution and operative for obtaining account balances, available funds for future transactions, confirming account balances or placing automatic holds on available funds as well as any other check transaction management services that a depositor may require to effectively manage his/her checking or savings account.

27 Claims, 12 Drawing Sheets

(56) References Cited

U.S. PATENT DOCUMENTS

| | | |
|---|---|---|
| 2002/0152179 A1* | 10/2002 | Racov .............................. 705/67 |
| 2003/0149728 A1* | 8/2003 | Wewalaarachchi et al. .. 709/206 |
| 2003/0159053 A1* | 8/2003 | Fauble et al. ................. 713/189 |
| 2003/0210946 A1* | 11/2003 | De Schrijver ................. 401/195 |
| 2004/0044627 A1* | 3/2004 | Russell et al. .................. 705/50 |
| 2004/0064414 A1* | 4/2004 | Silverbrook et al. ........... 705/42 |
| 2004/0218051 A1* | 11/2004 | Hsu .......................... 348/207.99 |
| 2005/0071283 A1* | 3/2005 | Randle et al. ................... 705/75 |
| 2005/0088349 A1* | 4/2005 | Ikeda et al. .................... 343/702 |
| 2005/0097179 A1* | 5/2005 | Orme ............................. 709/207 |
| 2005/0122209 A1* | 6/2005 | Black ........................... 340/5.52 |
| 2005/0125228 A1* | 6/2005 | Samuels ........................ 704/260 |
| 2005/0150945 A1* | 7/2005 | Choi ............................. 235/379 |
| 2006/0046650 A1* | 3/2006 | Kohli et al. ................... 455/41.2 |
| 2006/0192772 A1* | 8/2006 | Kambayashi ................. 345/179 |
| 2006/0229978 A1 | 10/2006 | Popovic et al. |
| 2006/0244737 A1* | 11/2006 | Dodge .......................... 345/179 |
| 2007/0027804 A1* | 2/2007 | Vega ............................... 705/39 |
| 2007/0030257 A1* | 2/2007 | Bhogal et al. ................. 345/179 |
| 2009/0094170 A1* | 4/2009 | Mohn .......................... 705/36 T |
| 2009/0149219 A1* | 6/2009 | Rhee et al. .................... 455/557 |
| 2010/0015944 A1 | 1/2010 | Smith |
| 2011/0226852 A1 | 9/2011 | Brennan |

* cited by examiner

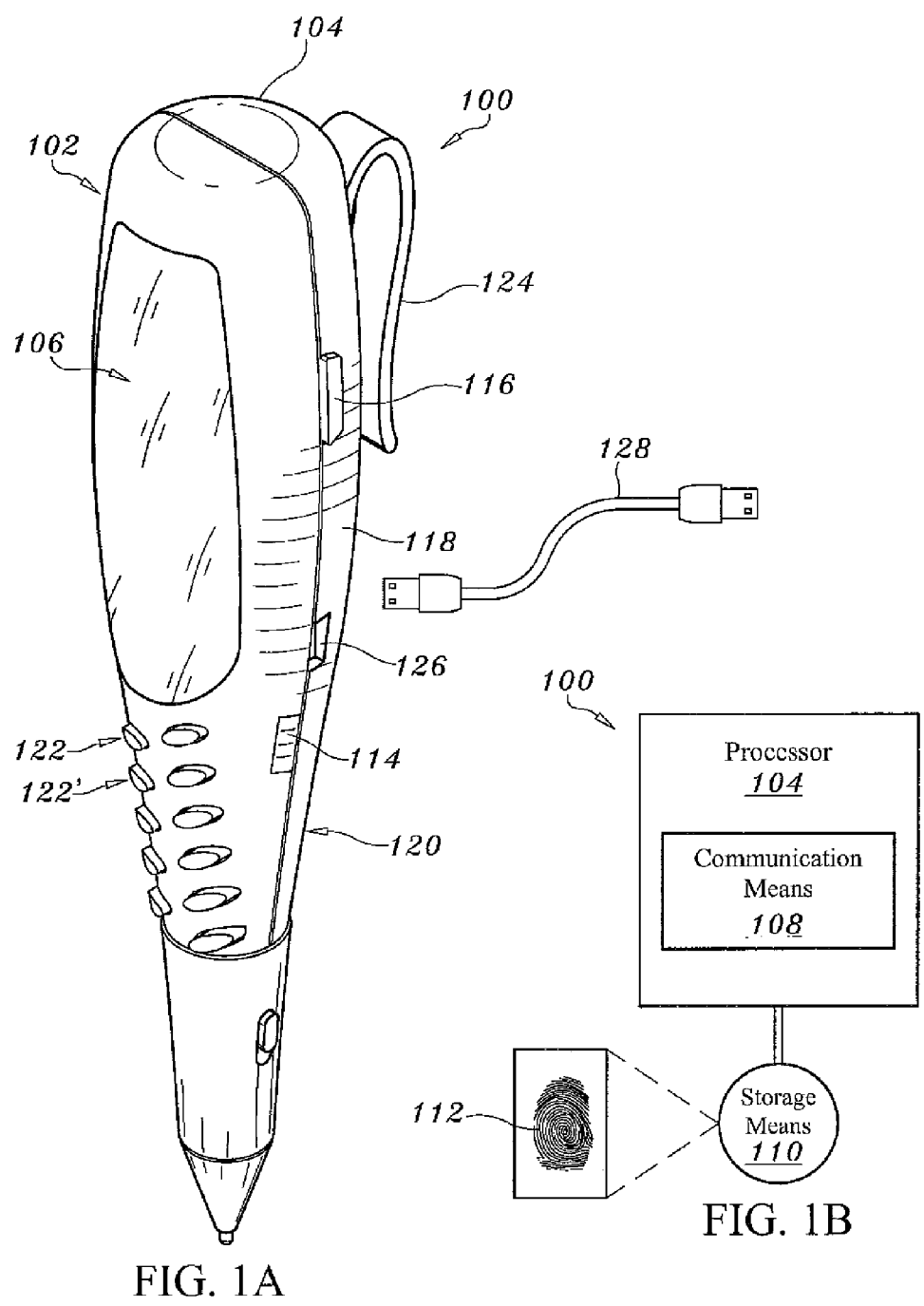

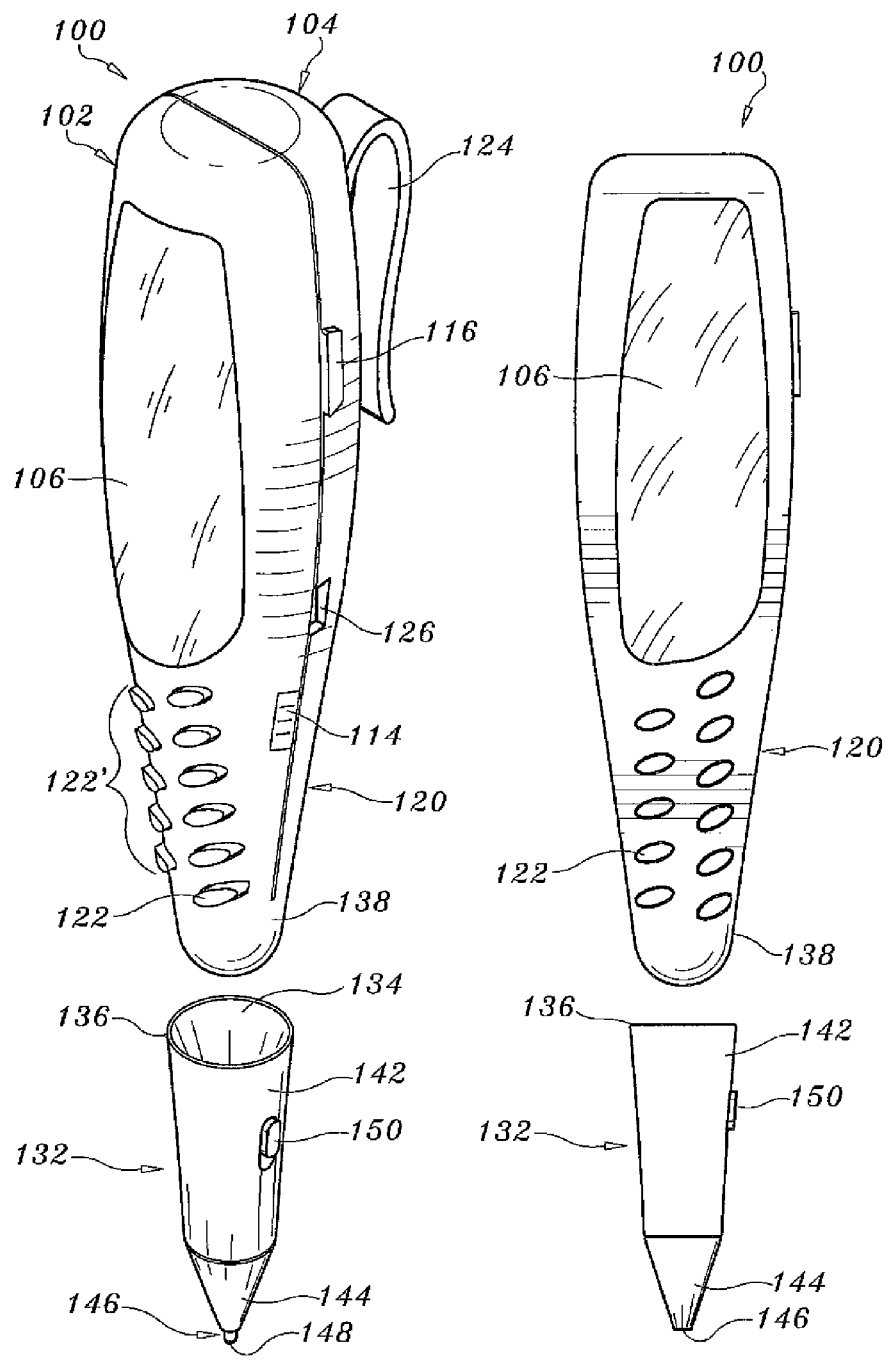

| Device Identification Number | Encryption Key | Name | Address | Account Number | Password | Account Balance |
|---|---|---|---|---|---|---|
| 000777 | A**Z11 | John Doe | 1 Main Street Anywhere, USA 00000 | 001672 | DRXXX | $15,000.00 |
| 000737 | B**Y21 | Jane Doe | 1 Main Street Anywhere, USA 00000 | 003431 | VIXXX | $65,007.89 |

FIG. 3

PORTABLE CHECK TRANSACTION MANAGER DEVICE, SYSTEM AND METHOD

PRIORITY CLAIM

This patent application is a continuation in part of, and claims priority to U.S. Non-Provisional patent application Ser. No. 29/315,925 titled Portable Check Transaction Manager Device filed Aug. 6, 2009 now U.S. Pat. No. Des.613,738. The entire disclosure of the afore-mentioned application is incorporated by reference as if fully stated herein.

FIELD OF THE INVENTION

The present invention is directed to an apparatus, system and method for managing bank transactions, configured for communicating with a depositor's account at a banking institution and operative for obtaining account balances, available funds for future transactions, confirming account balances or placing automatic holds on available funds as well as any other check transaction management services that a depositor may require to effectively manage his/her checking or savings account.

PRIOR ART

Bank customers are often forgetful of their available balances, and/or miscellaneous transactions that reduce their available credit causing them to unintentionally write checks for which there are insufficient funds to clear the checks when presented to the bank for payment. This practice can prove to be quite costly for the customer as the aggregate bank fees for overdraft protection and insufficient funds are arguably not worth the overdraft protection. For example, a customer may write a check for a sizeable amount to a trusted third party vendor, e.g. $1,500.00 to Sears. Between tendering the check to Sears and Sears presenting the check to the bank for payment, the customer may use a bank card linked to the same checking account for other miscellaneous expenses, e.g. a parking fees and/or a withdrawal, creating a minor shortfall in his or her account, e.g. $25.00. Since the third party vendor is a trusted vendor, banks will allow the check to clear by providing the $25.00 in overdraft protection. However, the customer will be charged a fee for overdraft protection, e.g. $35.00, and a second fee for insufficient funds, e.g. $30.00. Therefore, the true cost to the customer for the $25.00 shortfall is $65.00.

Although, the above stated scenario enables banks to earn additional income, banks also lose several million dollars every year with little hope of stemming the losses on account of bad checks. Check payees generally have no way of knowing beforehand if the payor has sufficient funds to clear the check as issued. Check verification services of the prior art attempt to mitigate the risks of accepting bad checks by conducting a limited background and/or credit check for the payor, verifying whether the payor has a history of writing bad checks. Based on that history, a payee can decide whether to accept the check. However, the most critical information, i.e. whether the payor has sufficient funds to clear the check as drafted is still not addressed by the background and/or credit check of the prior art. Thus, there is a need for banks, merchants and/or other payees to be able to determine with a greater degree of certainty if sufficient funds are available to clear a check being tendered as payment on an as needed basis. Similarly there is a need for payors to be able to confirm their available balances in an easy, efficient and convenient manner.

Accordingly, the various embodiments and disclosures described herein satisfies these long felt needs and solves the limitations of the prior art in a new and novel manner.

SUMMARY

A primary objective of the invention is to provide a convenient, portable apparatus, system and method of performing bank transactions for a depositor's bank account at an issuing banking institution.

Another objective of the invention is to provide an apparatus, system and method configured to communicate with a depositor's bank in a secure manner maintaining the privacy and integrity of the depositor's account information.

Still yet another objective of the invention is to provide an apparatus, system and method operative to reconcile at least one depositor's bank account or place automatic holds on a depositor's funds to cover a newly issued check that may be presented for payment at a later date.

Yet another objective of the invention is to mitigate losses by banks from bad checks.

Another objective of the invention is to provide a self-contained apparatus, system and method operative to perform bank transactions with the ease and convenience of portable, small device.

The present invention overcomes the limitations of the prior art by an apparatus, system and method comprising of: a small, portable check transaction manager device uniquely identifiable to an issuing banking institution, operative for accessing at least one depositor's account at the issuing banking institution for performing bank transactions over a closed network; and at least one processor positioned within the check transaction manager device operative for performing bank transactions. Banking institution as used herein includes but is not limited to the depository institutions, e.g. credit unions, banks and the like.

Portable check transaction manager device is configured for storing thereon any one or more of the following: apparatus' verifiable unique identifier; the unique electronic encryption key assigned to each apparatus; depositor's account information; date and time stamp for last access to banking institution, the apparatus' electronic password key(s) that may be synchronized with the banking institution and/or depositor's biometric identifier obtained via apparatus' biometric verification means. "Biometric identifier" as used herein describes a biometric sample obtained from the depositor that uniquely identifies the depositor based on his/her intrinsic physical traits, e.g. fingerprints, retina scan, palm geometry, hand geometry, speech, and or other biometric identifiers that are used in the arts. Biometric verification means includes but is not limited to: fingerprint recognition means, hand geometry recognition means, palm geometry recognition means, iris recognition means, retina recognition means, speech recognition means and any other biometric verification means that are known and used in the arts. Biometric verification means may include the at least one processor disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry for speech recognition. The at least one processor is configured for processing at least one biometric sample, e.g. validating a biometric sample with the biometric identifier stored on the apparatus.

The portable check transaction manager device further comprises of display means positioned thereon, where the display means includes but is not limited to: a liquid crystal display ("LCD") screen, a light emitting diode ("LED") screen, or a monitor and the like.

The check transaction manager device includes at least one communications means operative to transmit or receive depositor's account information via a wireless protocol. The at least one communications means comprises of any one or more of the following: a receiver, a transmitter, a transceiver, a positioning system receiver, a wireless modem, a global system for mobile communications modem or any other communications means that are used in the arts. The at least one depositor's account information includes but is not limited to any one or more of the following: check transaction manager device's identification number, encryption key for issued check transaction manager device; depositor's name, depositor's address; depositor's at least one account number, depositor's password, at least one account balance, at least one banking institution's routing number, apparatus' password key(s), at least one check number, amount for at least one check, name of issuing banking institution, available check ranges, signatories for the at least one account, and accounts linked to apparatus and the like.

Each check transaction manager device includes a verifiable unique identifier used to identify the apparatus to an issuing banking institution as an authorized portable check transaction manger device authorized to access depositor's banking information at the issuing banking institution.

In one embodiment, the portable check transaction manger device includes a detachable writing assembly with at least one marking element positioned within. Such detachability may be achieved by providing at least one aperture at the upper portion of the detachable writing assembly configured to receive a tapered end of the elongated member of the check transaction manger device, where it may be detachably affixed and secured via a suction mechanism. In some embodiments, the portable check transaction manger device's tapered end may also include additional fastening means. Such fastening means may include but is not limited to: at least one thread, glue, snaps, a plurality of monofilament hoops and loops, and the like. Portable check transaction manger device may also include securing means for securing the check transaction manger device to an article of clothing. Such securing means may include but is not limited to: a clip, snaps, fasteners, a loop, a plurality of miniature filament hook and loop elements and the like.

System and method comprises of a check transaction manager device uniquely identifiable to an issuing banking institution, operative for accessing at least one depositor's account at the issuing banking institution; at least one processor positioned within the check transaction manager device operative for performing bank transactions; and computer executable instructions executable by the at least one processor. The check transaction manager device is configured for storing thereon a biometric identifier.

The computer executable instructions executable by the at least one processor are operative to perform any one or more of the following: verify authenticity of the check transaction manager device as being issued by the issuing banking institution; reconcile the at least one depositor's account; confirm depositor's account balance; place automatic holds against available funds in the at least one depositor's account; electronically store a biometric identifier on the check transaction manager device; validate a biometric sample with a biometric identifier stored on the check transaction manager device and the like.

System and method also comprises of the at least one processor in communication with at least one display means configured to display thereon at least one depositor's account information. System and method also comprises of the at least one communication means in communication with the at least one processor and operative to transmit or receive at least one depositor's account information from the issuing banking institution. The at least one communications means comprises of any one or more of the following: a receiver, a transmitter, a transceiver, a positioning system receiver, a wireless modem, a global system for mobile communications modem. Processor encodes the depositor's account information into an electronic signal, which is encrypted forming an encrypted signal containing the containing the depositor's account information that is transmitted to the issuing banking institution where the transmitted electronic signal is decoded in real-time. In this manner, the security and integrity of the depositor's account information remains intact.

The apparatus is configured for being activated, e.g. by the depositor, to authorize connectivity to at least one depositor's account for performing bank transactions. The at least one processor of the check transaction manager device is configured to: display at least one depositor's account information on the check transaction manager device's display means or any other display means which are remotely or electrically connected to the check transaction manager device.

In some embodiments method comprises of: using a check transaction manager device operative for accessing at least one depositor's account at the issuing banking institution; and using at least one processor positioned within a check transaction manager device operative for performing bank transactions. The method may also comprises of providing computer executable instructions executable by the at least one processor and operative to verify authenticity of the check transaction manager device as being issued by the issuing banking institution; reconcile the at least one depositor's account; confirm depositor's account balance; place automatic holds against available funds in the at least one depositor's account; electronically store a biometric identifier on the check transaction manager device; and validate a biometric sample with a biometric identifier stored on the check transaction manager device, and the like.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

FIGS. 1A & 1B are exemplary embodiments of the apparatus.

FIG. 1E is an exemplary embodiment of the detachable writing assembly of the apparatus in an extended position.

FIG. 1F is an exemplary embodiment of the detachable writing assembly of the apparatus in the retracted position.

FIG. 3 shows an exemplary at least one depositor's account information.

DETAILED DESCRIPTION OF PREFERRED EMBODIMENTS

Figure 1C:
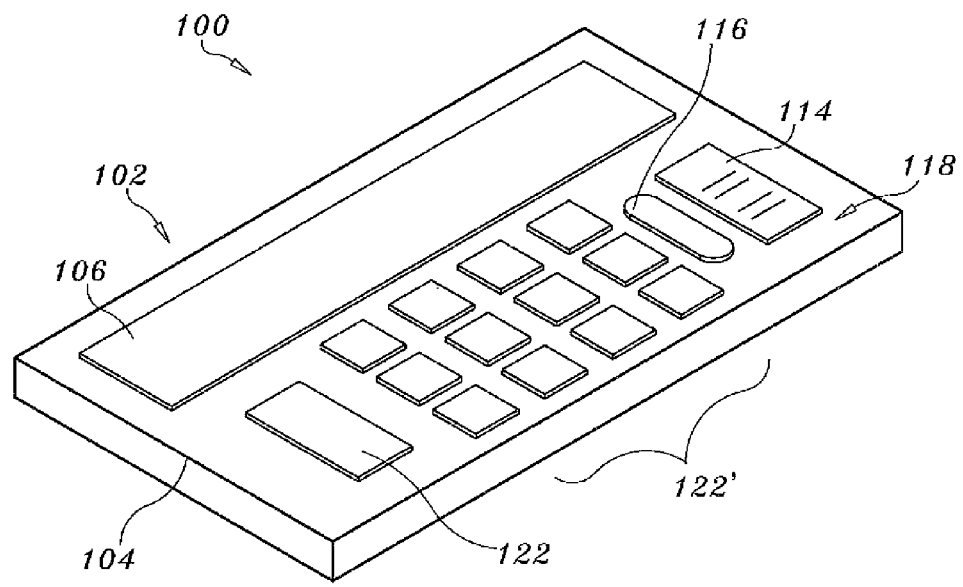
FIGS. 1C & 1D show illustrative views of an alternate embodiment of the apparatus.

The following discussion describes in detail an embodiment of the system and methods for managing check transactions using the apparatus described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatuses

FIGS. 1A & 1B are exemplary embodiments of the apparatus 100. Apparatus 100 comprises of: a small, portable check transaction manager device 102 uniquely identifiable to an issuing banking institution, operative for accessing at least one depositor's account at the issuing banking institution, for performing bank transactions over a closed network. Banking institution as used herein includes but is not limited to depository's institutions, such as, credit unions, banks and the like.

Figure 1D:
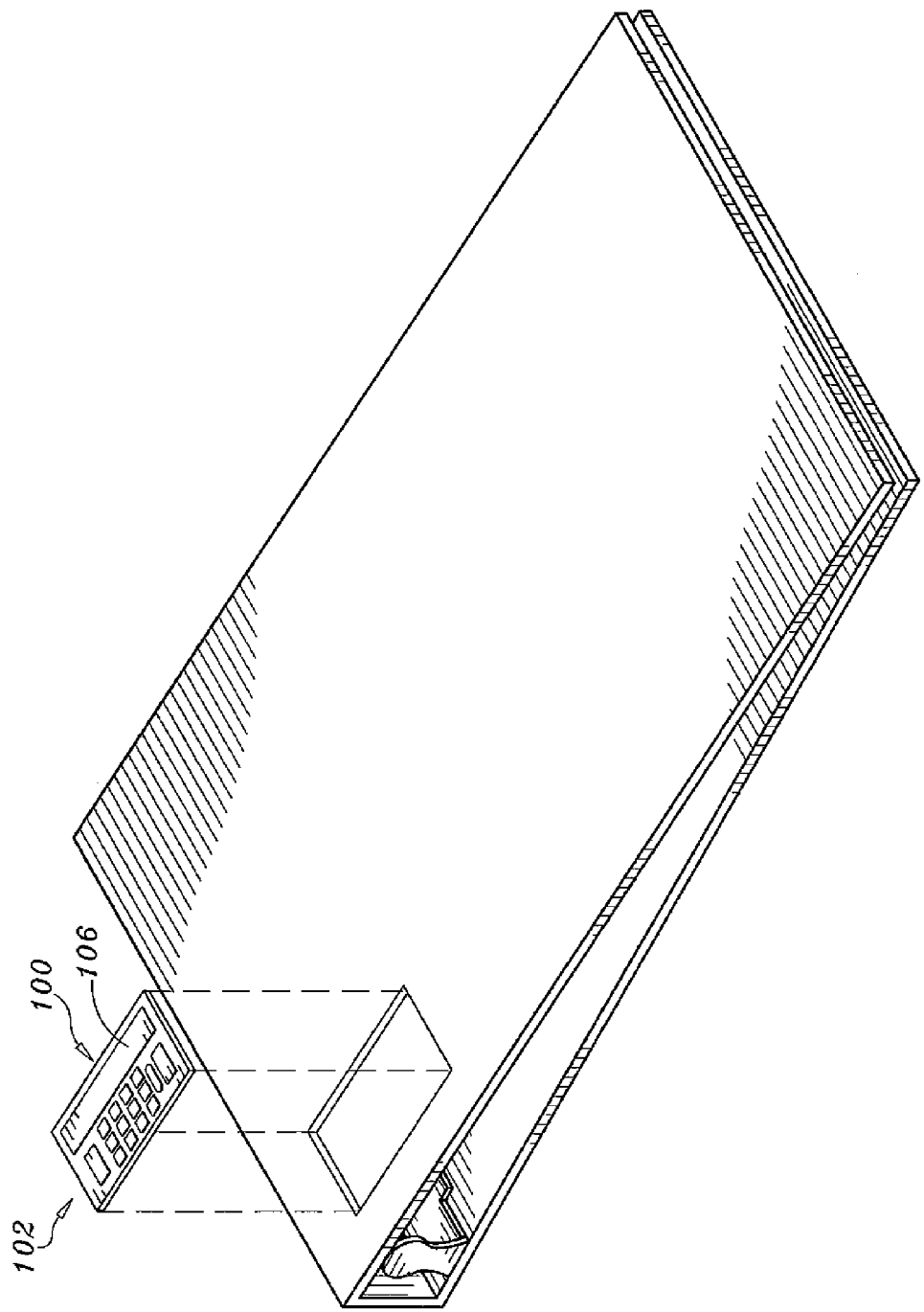

FIGS. 1C & 1D show illustrative views of an alternate embodiment of the apparatus 100, where the apparatus 100 may be used as a stand-alone device or may be detachably affixed to a checkbook binder specifically configured for receiving and/or securing the check transaction manager device 102 therein.

Apparatus 100 includes at least one processor 104 positioned within, operative for performing bank transactions, and at least one display means 106 positioned thereon. Processor 104 may be any type of processor, such as, but not limited to, a central processing unit (CPU), a microprocessor, a video processor, a front end processor, a coprocessor, a single-core processor, a multi-core processor, and the like. In some embodiments, the at least one processor 104 is positioned within the apparatus 100 and is configured for verifying the authenticity of the check transaction manager device 102 as being issued by the issuing banking institution; reconciling the at least one depositor's account; confirming depositor's account balance; placing automatic holds against available funds in the at least one depositor's account in response to new bank transactions posted to the at least one depositor's account that have not yet been presented to the issuing banking institution for payment; or any other bank transactions a depositor may require apparatus 100 to perform in managing his/her account. Such bank transactions may require for example, processor 104 being programmed to use a mathematical algorithm to determine depositor's actual balance in response to submission of at least one new bank transaction, such as a debit, newly written check, fund transfer and the like.

Communications between apparatus 100 and the banking institution are accomplished via the apparatus' at least one communication means 108, which employ short range wireless protocol. Communication means 108 are either electrically or mechanically connected to processor 104. In the case of electronic connections, the electronic connections may be wired and/or wireless. Communications means 108 are operative to transmit or receive depositor's account information via a short range wireless protocol, such as, but not limited to, a radio frequency receiver, a radio frequency transmitter, a radio frequency transceiver. In embodiments where the wireless communication means 108 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In one embodiment, communication means 108 may employ wireless protocols like Blue Tooth, ZigBee, 802.11 series, or a wireless modem, such as, but not limited to, a global system for mobile communications (GSM) modem, or any other short range wireless protocol that is well known and used in the arts. In some embodiments, communication means 108 is embedded within the at least one processor 104 as shown in FIG. 1B.

In some embodiments, apparatus 100 may include at least one storage means 110 either electrically or mechanically connected to processor 104. In the case of electronic connections, the electronic connections may be wired and/or wireless connections. The information stored within the storage means 110 may be retrieved using the at least one processor 104. In one embodiment, storage means 110 may comprise of both hardware and software components. In the preferred embodiment, storage means 110 is embedded within the at least one processor 104 where the information stored therein is encrypted for security purposes. Storage means 110 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. In some embodiments, storage means 110 may also be used to store information, such as the apparatus' verifiable unique identifier used to identify the apparatus 100 to an issuing banking institution as an authorized apparatus 100; the unique encryption key assigned to each apparatus 100 for communicating with the issuing banking institution; depositor's account information; date and time stamp for last access to banking institution, the apparatus' electronic password key(s) that may be synchronized with the banking institution, depositor's biometric identifier 112 obtained via apparatus' biometric verification means 114 and the like.

"Biometric identifier" 112 as used herein describes a biometric sample obtained from the depositor that uniquely identifies the depositor based on his/her intrinsic physical traits, e.g. fingerprints, retina scan, palm geometry, hand geometry, speech, and or other biometric identifiers 112, 112' that are used in the arts. Biometric verification means 114 includes but is not limited to: fingerprint recognition means, hand geometry recognition means, palm geometry recognition means, iris recognition means, retina recognition means, speech recognition means and any other biometric verification means 114 that are known and used in the arts. Biometric verification means 114 may include the at least one processor 104 disposed in communication with, for example, a fingerprint scanner (as shown in FIGS. 1A, 1C & 1E), hand geometry scanner, a palm geometry scanner, iris scanner, retina scanner, or a user interface which includes an audio receiving circuit capable of receiving audio signals at predetermined frequencies and/or with additional hardware complete with electronic circuitry for speech recognition. The at least one processor 104 is configured for processing at least one biometric sample, e.g. validating a biometric sample with the biometric identifier 112 stored on the apparatus 100 for an identical match.

The at least one display means 106 includes but is not limited to: a LCD screen, a LED screen, or a monitor and the like. In some embodiments, display means 106 is electronically connected to processor 104. In other embodiments, display means 106 is wirelessly connected to processor 104. In yet further embodiments, display means 106 may include a control means, such as, but not limited to, a touch screen, a stylus, and the like. Processor 104 is configured for displaying at least one depositor's account information on the check transaction manager device's display means 106. Processor 104 may also be programmed to solicit instructions from the depositor, e.g. request the check amount or check number and/or other like instructions which are similarly displayed on the display means 106.

Apparatus 100 may include an activation button 116 used to activate/deactivate the check transaction manager device 102 by turning the apparatus 100 "On" or "Off". In some embodiments, apparatus 100 may be activated/deactivated using touch screen technology and/or speech recognition means, where by touching the screen or using voice commands the apparatus 100 may be turned on or off. Activation button 116 may be used for activation, e.g. by the depositor, to authorize connectivity to at least one depositor's account for performing bank transactions with the issuing bank institution relating to that account. Activation button 116 may be positioned along the apparatus' exterior 118 as seen in FIGS. 1A & 1C. Illustratively, as seen in FIG. 1A, activation button 116 may also be positioned along the elongated member 120 of the check transaction manger device 102. However, it is understood that the activation button 116 may be positioned in any location on the apparatus 100.

Apparatus 100 may also include other programmable keys 122, 122' used to input at least one depositor's account information. The at least one depositor's account information as used herein includes but is not limited to any one or more of the following: check transaction manager device's identification number, encryption key for issued check transaction manager device; depositor's name, depositor's address; depositor's at least one account number, depositor's password, at least one account balance, at least one banking institution's routing number, apparatus' password key(s), at least one check number, amount for at least one check, name of issuing banking institution, available check ranges, signatories for the at least one account, and accounts linked to apparatus and the like. The programmable keys 122, 122' may be identifiable by alphanumeric characters, which may include but is not limited to numbers from "0-9", letters "A-Z", other alphanumeric characters like "#", "$", ".", "Send", "Cancel", and/or other alphanumeric characters used in the arts. Alternatively, apparatus 100 may include a touch screen keypad, virtual keypad, or a conventional keypad, like "QWERTY keypad" or any other keypad used in the arts.

Apparatus 100 may also include securing means 124 for securing the check transaction manger device 102 to an article of clothing. Such securing means 124 include but is not limited to: a clip, snaps, fasteners, at least one loop, buttons, a plurality of miniature filament hook and loop elements or any other securing means 124 used in the arts.

Apparatus 100 may include a universal serial bus (USB) port 126 for optional connectivity to a computer either electronically and/or mechanically via connecting means 128. Connecting means 128 may be any kind of connecting means 128, including, but not limited to, cables, such as, but not limited to, a coaxial cable, a USB cable, a network cable, an RCA cable, a steel cable, a fiber optic cable, and the like. In such embodiments, apparatus 100 may obtain its power via a cable, such as a USB cable, or any other type of power connection, such as a socket, docking station, and the like. In another embodiment, apparatus 100 may include its own means for receiving power from an independent power supply, such as a power socket to be connected to a power cord and plugged into an electrical outlet or alternatively apparatus 100 may include a battery 130 (not shown) positioned within for wireless connectivity.

FIGS. 1E & 1F are exemplary embodiments of the apparatus' self-contained detachable writing assembly 132 in the extended and retracted positions, respectively. Such detachability may be achieved by providing at least one aperture 134 at the upper portion 136 of the detachable writing assembly 132, wherein the aperture 134 is configured for receiving a tapered end 138 of the apparatus' elongated member 120, where the detachable writing assembly 132 may be detachably affixed and secured via a suction mechanism. In some embodiments the apparatus' tapered end 138 may also include additional fastening means 140 (not shown). Such fastening means 140 (not shown) may include but is not limited to: at least one thread, glue, snaps, a plurality of monofilament hoops and loops, and the like.

Detachable writing assembly 132 comprises of a cylindrical barrel 142, which has a length tapering downwardly to a point 144, where the cylindrical barrel 142 includes an aperture 146, through which the marking element 148 positioned within extends therethrough, such that when the marking element 148 is applied to a writing surface a writing may be legibly displayed. Marking element 148 may comprise of any one of the following: a pencil's lead, a ballpoint pen's assembly, or marker's felt or any other marking element used in the arts.

In one embodiment, positioned on the detachable writing assembly 132 is a marking element's engagement apparatus 150 mechanically connected to the marking element 148, such that when the marking element's engagement apparatus 150 is engaged the marking element 148 is either extended (see FIG. 1E) or retracted (see FIG. 1F). The marking element's engagement apparatus 150 may include a spring apparatus, twist element or the like.

Systems

Figure 2:
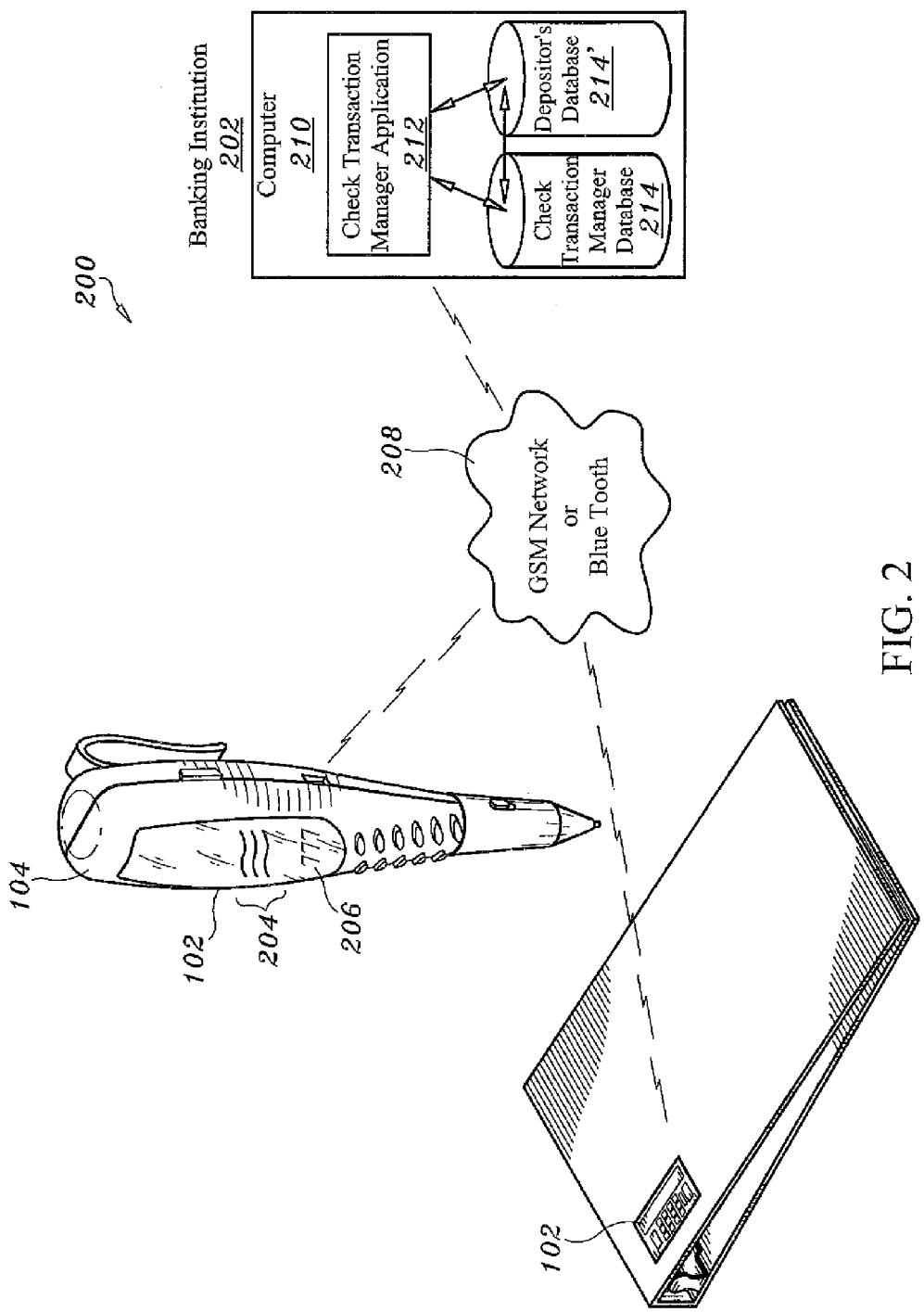
FIG. 2 is an exemplary system of the invention.

FIG. 2 is an exemplary system 200 of the invention. System 200 comprises of a check transaction manager device 102 uniquely identifiable to an issuing banking institution 202, operative for accessing at least one depositor's account at the issuing banking institution 202; at least one processor 104 positioned within the check transaction manager device 102 operative for performing bank transactions; and computer executable instructions 204 executable by the at least one processor 104. Each check transaction manager device 102 includes a verifiable unique identifier 206 used to identify the apparatus 100 to an issuing banking institution 202 as an authorized portable check transaction manger device 102 authorized to access depositor's banking information at the issuing banking institution 202. The unique identifier 206 may comprise of a serial number, random numbers generated by a random number generating program using alphanumeric characters, or any other unique identifiers 206 used in the arts.

Each check transaction manager device 102 may also be assigned a unique electronic encryption key(s) of military grade, used to encrypt transmissions between the apparatus 100 and the banking institution 202. As such, processor 104 encrypts transmissions of depositor's account information from the apparatus 100 to the issuing banking institution 202 forming an encrypted electronic signal containing the depositor's account information. Likewise, transmissions from the issuing banking institution 202 are similarly encrypted with the encryption key such that only the apparatus 100 with the corresponding encryption key can decrypt the electronic signal containing the depositor's account information. Therefore, communications between the check transaction manager device 102 and the issuing banking institution 202 are secured and confirmed as being transmitted and/or received from or by a trusted source.

In some embodiments, verification includes activation of the apparatus 100 using biometric verification means 114 used to authenticate the identity of the individual or entity attempting to access the issuing banking institution 202. Biometric verification means 114 comprises of those biometric verification means 114 previously described, which may include at least one processor 104 disposed in communication with for example, a fingerprint scanner 108, hand geometry scanner, a palm geometry scanner, iris scanner, retina scanner, or speech recognition means, i.e. a user interface which includes an audio receiving circuit capable of receiving audio signals at predetermined frequencies and/or with additional hardware complete with electronic circuitry, and such other biometric verification means 114 that are known and used in the arts. Prior to the check transaction manager 102 being used for bank transactions, a biometric sample for the depositor is obtained and enrolled as a biometric identifier 112 for future reference and comparison as the check transaction manger device 102 is configured for storing thereon at least one biometric identifier 112. Thereafter, in validating the identity of the depositor or another attempting to use the apparatus 100, the at least one processor 104 disposed in communication with e.g. a fingerprint scanner, validates the image of the biometric sample, with the biometric identifier 112 stored thereon. In this manner, an unauthorized user will be prevented from using someone else's apparatus 100 to access another depositor's account.

Check transaction manager device 102 is configured for providing wireless, remote connectivity to the depositor's account at the issuing banking institution 202 and configured for storing thereon select depositor's account information 110. Check transaction manager device 102 is adapted with communications means 108 for transmitting and/or receiving wireless communications through a wireless communications network to and from the issuing banking institution 202. Communication means 108 may include but is not limited to Blue Tooth, ZigBee, 802.11 series, or any other short range wireless protocol that is well known and used in the art and other future short range wireless protocol suitable for transmitting and receiving data. Accordingly, the check transaction manager device 102 may communicate with the banking institution 202 over a global system for mobile communications (GSM) network 208, cellular phone network using Blue Tooth or a satellite system and the like. In other embodiments, communications means 108 may be a wireless modem, such as, but not limited to, GSM modem. In some embodiments, communications means 108 may receive a signal from a positioning system, such as a global positioning system or local positioning system, which may originate from a satellite, or a ground based antenna.

System 200 may also comprise of computer executable instructions 204 executable by the at least one processor 104 positioned within the apparatus 100, and operative to perform the system 200 and methods disclosed herein. Computer executable instructions 204 may be loaded directly on the apparatus' processor 104, or may be stored in apparatus' storage means 110, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 204 may be any type of computer executable instructions 204, which may be in the form of a computer program, the program being composed in any suitable programming language or source code, such as C++, C, JAVA, JavaScript, HTML, XML, and other programming languages. Computer executable instructions 204 are operative to perform any one or more of the following: verify the authenticity of the check transaction manager device 102 as being issued by the issuing banking institution 202; reconcile the at least one depositor's account; confirm depositor's account balance; and/or place automatic holds against available funds in the at least one depositor's account as well as any other system 200 function. In yet another embodiment, the computer executable instructions 204 are operative to perform password verification or identity verification using a biometric verification means 114 and the like.

System 200 includes a computer 210 at the issuing banking institution 202 configured with a check transaction manager application program 212 to allow wireless remote communication twenty fours a day between at least one apparatus 100 and the banking institution 202 such that a depositor may perform bank transactions anywhere and anytime. Computer is configured for accessibility by at least one apparatus 100 over a closed network, i.e. direct link to the issuing banking institution's computer 210 without using the Internet or another browser application.

Prior to issuing an apparatus 100 to a depositor, the apparatus' identifying information is registered with the system 200, e.g. apparatus' unique identifier, serial number, electronic encryption key(s) etc., and linked to at least one depositor and by extension at least one depositor's account information. In some embodiments, issuing banking institution 202 maintains a check transaction manager database 214 for each apparatus' identifying information issued to the select depositors. Check transaction manager database 214 may include the apparatus' identifying information, e.g. the unique identifier 206 and/or the encryption key, such that the system 200 can readily verify the authenticity of the check transaction manager device 102 as being issued by the issuing banking institution 202 for a specific depositor. Additional security parameters may be stored in the check transaction manager database 214 which may include additional security codes, timed password key(s) for at least one apparatus 100 that are synchronized with the banking institution, or depositor's biometric identifier 112 received during registration of the apparatus 100 being issued to depositor, using apparatus' biometric verification means 114 and/or other security mechanisms.

Banking institution 202 may also maintain a separate depositor's database 214', which includes at least one depositor's account information, such as, account balance, available check ranges, signatories for the at least one account, account numbers for linked accounts and the like. Check transaction manager application program 212 is programmed to read the information stored within the check transaction manager database 214 and/or the depositor's database 214' in instances where two separate databases 214, 214' are maintained, such that a depositor's account information may be accessed by at least one apparatus 100.

In some embodiments, both databases 214, 214' are condensed into a single database 214. In those instances, the databases 214 still remains accessible to the check transaction manager application program 212 and all depositors' account information and the issued apparatus' identifying information is maintained in one database 214. Illustratively, as seen in FIG. 3, an exemplary at least one depositor's account information 300 is shown. Such at least one depositor's account information 300 may include but is not limited to any one or more of the following: check transaction manager device's identification number 206, accounts 302 (not shown) linked to the apparatus 100, encryption key for issued check transaction manager device 304; depositor's name 306, depositor's address 308; depositor's at least one account number 310, depositor's password 312, at least one account balance 314, at least one banking institution's routing number 316 (not shown), apparatus' password key(s) 318, at least one check number 320 (not shown), amount for at least one check 322 (not shown), name of issuing banking institution 324 (not shown), available check ranges 326 (not shown), signatories (328 (not shown) for the at least one account, and any other pertinent account information.

Databases 214, 214' may include storage means 110' where the storage means 110' have sufficient capacitance to support maintaining adequate security and communications between the apparatus 102 and the issuing banking institution 202. Storage means 110, include but is not limited to RAM, SRAM, DRAM storage media or any other faun of recording and storage media that are well known and used in the arts suitable for practicing the invention.

Methods

Figure 4:
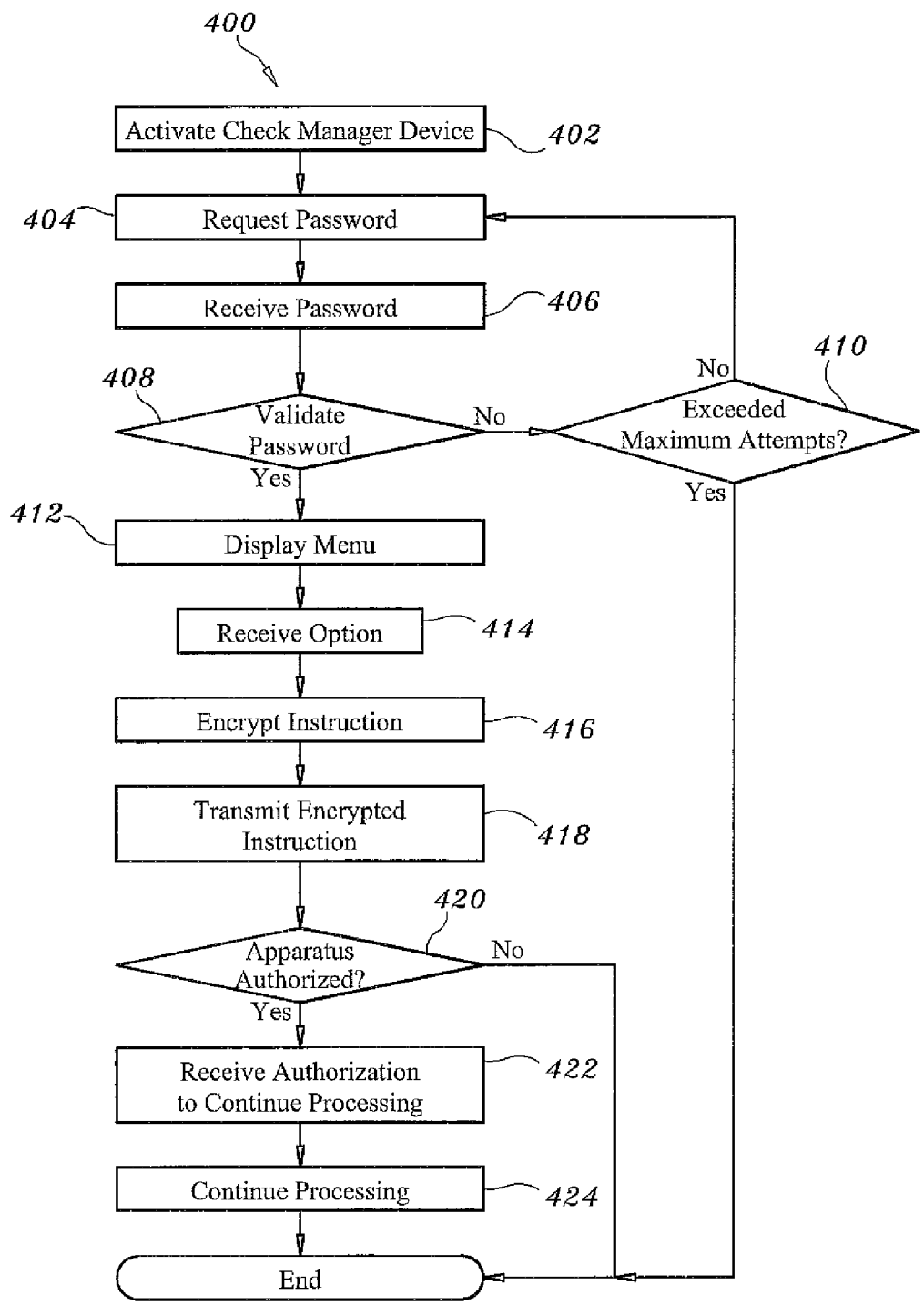
FIG. 4 is a sample flowchart of a block diagram of an exemplary method of verifying authorization according to one embodiment.

FIG. 4 is a sample flowchart of block diagram of an exemplary method 400 of verifying the apparatus' 100 authenticity. Prior to conducting any bank transactions using the apparatus 100, the apparatus 100 and/or depositor must be authorized by the issuing banking institution 202 to conduct bank transactions on the depositor's behalf.

Apparatus 100 may be activated via the activation button 116 or by using touch screen technology (step 402). In some embodiments, once activated, depositor may be prompted to verify his/her identity, where apparatus 100 may for instance request the depositor's password (step 404) by displaying the request on the display means 106. Check transaction manager device 102 receives the depositor's password (step 406) and validates the password (step 408). If depositor's password is correct, method 400 proceeds directly to step 412. However, if the password is incorrect and the depositor has not exceeded the maximum allowed attempts (step 410), apparatus 100 will continue to prompt depositor for the correct password by returning to steps 404-step 410 until either the correct password has been entered or the maximum number of attempts has been exceeded, in which case communications will cease until depositor is able to have the password reset.

If the depositor successfully gained access to the depositor's account information 300 with the banking institution 202, depositor may proceed to perform bank transactions by inputting instructions to the apparatus 100. Accordingly, check transaction manager device 102 may display a menu (step 412) from which depositor may select a bank transaction to be performed, for example, depositor may select an option, e.g. obtain his/her account balance. Selecting an option may be performed by using the alphanumeric keys 122, 122' positioned thereon, which are adapted with electrical contacts in electrical communication with the processor 104 or using a touch screen keypad as displayed on apparatus' display means 106.

However, prior to apparatus 100 executing any further instructions the depositor's and/or the apparatus' authorization must first be verified. Using the at least one processor 104 positioned within the check transaction manager device 100 operative for performing bank transactions and the computer executable instructions 204 executable by the at least one processor 104; processor 104 verifies the authenticity of the check transaction manager device 100 as being issued by the issuing banking institution. Processor 104 receives the option (step 414) e.g. obtain his/her account balance, forming an instruction, encrypts the instruction (step 416) for the option selected forming an encrypted electronic signal containing the instruction. Apparatus' communication means 108 transmits the encrypted electronic signal containing the instruction (step 418) to the issuing banking institution 202 where it is received and decrypted.

Apparatus 100 is then verified as to whether or not apparatus 100 is authorized (step 420). If apparatus is not authorized, i.e. registered as an authorized apparatus 100 with the issuing banking institution 202, where the identifier and/or the encryption key(s) is validated, then the banking institution 202 will issue notification of non-authorization for the apparatus 100 and apparatus 100 will be blocked from further processing. If apparatus 100 is authorized, banking institution 202 issues its authorization where apparatus 100 receives authorization to continue processing (step 422) and depositor may continue processing (step 424) until completion or apparatus 100 is manually deactivated.

Figure 5:
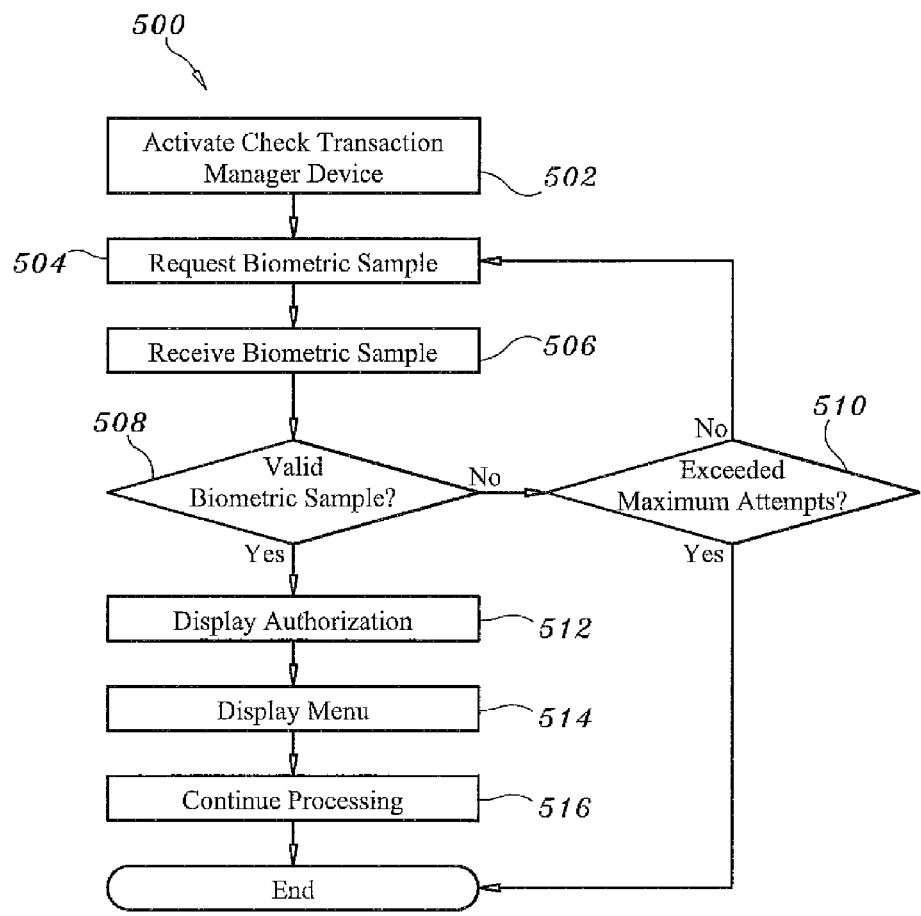
FIG. 5 is a sample flowchart of a block diagram of an exemplary method of verifying authorization according to another embodiment.

FIG. 5 is a sample flowchart of a block diagram of an exemplary method 500 of verifying authorization according to another embodiment. In some embodiments, apparatus 100 may be activated using touch screen technology where a biometric sample is obtained upon activation of the apparatus 100 via the biometric verification means 114. In other embodiments, the biometric sample is obtained after the apparatus 100 has been activated and may be submitted in lieu of providing a password for authentication purposes.

Illustratively, depositor may activate the check transaction manger device 102 (step 502) where apparatus 100 may request the biometric sample (step 504), where the apparatus 100 receives the biometric sample (step 506), and verifies the biometric sample as valid (step 508), by comparing the biometric sample to the biometric identifier 112 stored thereon for an identical match. If the biometric sample fails to match the biometric identifier 112, and the maximum attempts have not been exceeded (step 510), depositor may make additional attempts to provide his/her biometric sample. Method 500 will return to step 504-step 510 until the first of either he/she succeeds or the maximum attempts are exceeded, in which case processing will cease.

If however, the biometric sample matches the biometric identifier 112 stored thereon, apparatus may proceed to display authorization (step 512) and/or a display menu (step 514) and continue processing (step 516) until the apparatus 100 is either deactivated or processing ends. It is understood that displaying authorization (step 512) and displaying menu (step 514) may be performed as a combined step where such authorization and displaying the menu may illustratively be displayed as "WELCOME JOHN DOE. Enter the number for the transaction to be performed . . . 1—Obtain account balance, 2—Reconcile account, . . . " and the like.

Figure 6:
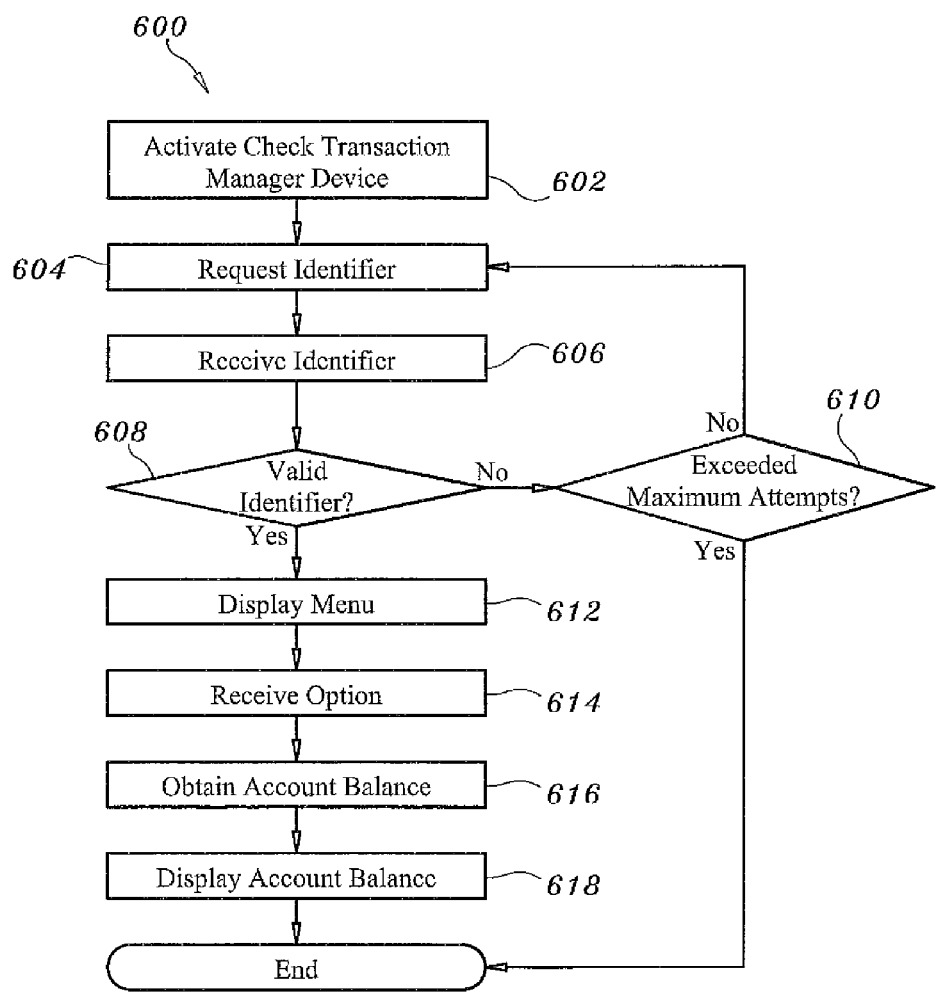
FIG. 6 is a sample flowchart of a block diagram of an exemplary method of obtaining a depositor's account balance using the apparatus.

FIG. 6 is a sample flowchart of a block diagram of an exemplary method 600 of obtaining a depositor's account balance using the apparatus 100. Depositor will need to activate the check transaction manger device 100 (step 602) and proceed to authenticate his or her authority to use the apparatus 100 (step 604-step 610) with a valid identifier, e.g. password or biometric sample, prior to performing any bank transactions. Such authentication may be performed via password verification as discussed in steps 404-410 of FIG. 4 or by validating a biometric sample by comparing it to the biometric identifier 114 stored thereon as discussed in step 504-step 510 of FIG. 5. Here too, if the depositor's authorization cannot be verified (step 608) all processing ceases.

Once the depositor's authorization is verified, apparatus' display means 106 displays a menu (step 612) from which depositor may select an option to obtain his/her account balance. Processor 104 receives the option (step 614) for obtaining account balance and proceeds to obtain the depositor's account balance (step 616) by first encrypting the instruction for obtaining account balance forming an encrypted electronic signal containing the instruction for obtaining depositor's account balance. Apparatus' communication means 108 transmits the encrypted electronic signal (step 615, not shown) containing the instruction to the issuing banking institution where it is received and decrypted. The depositor's account balance is obtained from the issuing banking institution 202 (step 616) and transmitted as an encrypted signal to the apparatus 100 where it is decrypted and the account balance is displayed on the display means 106 (step 618).

Figure 7:
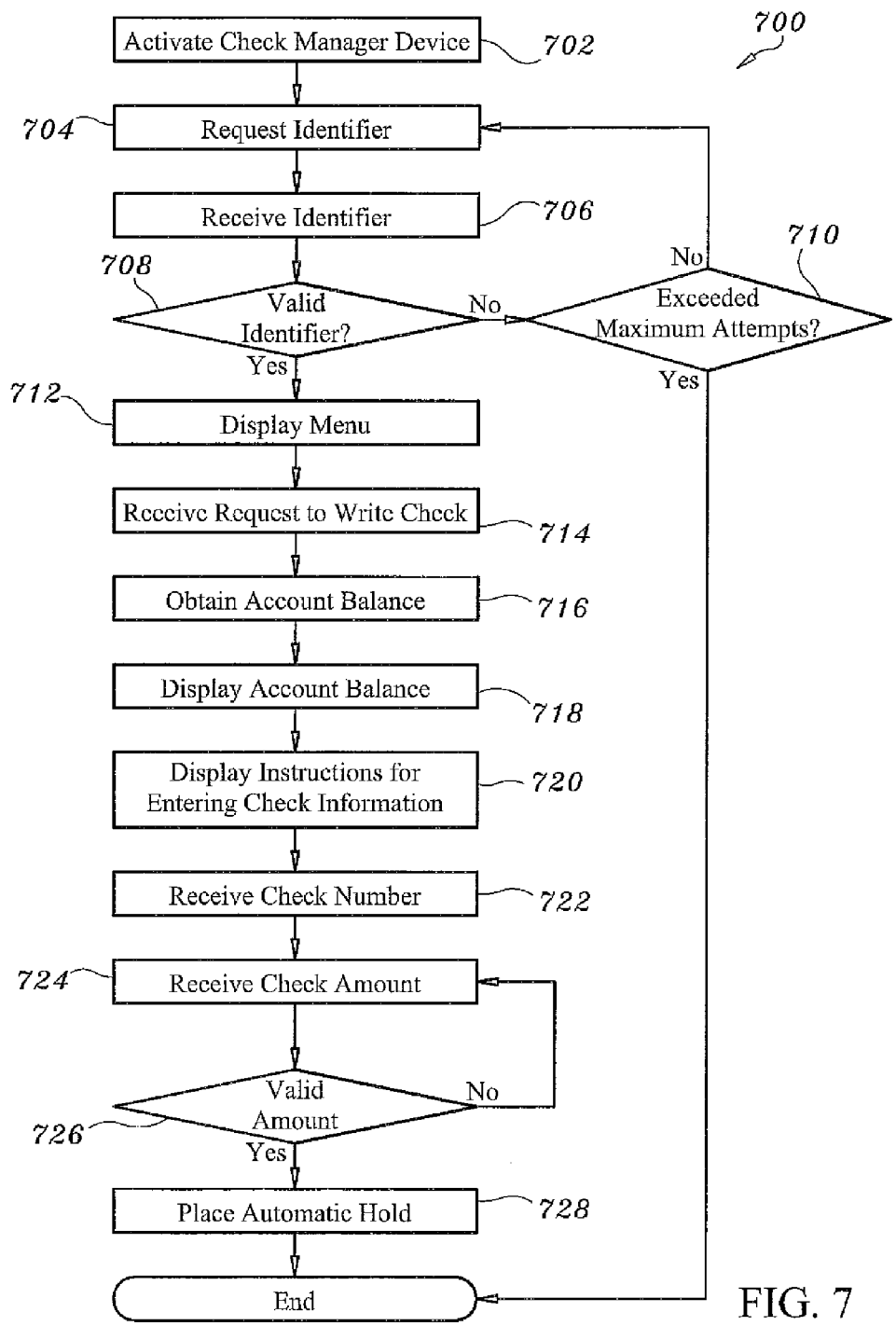
FIG. 7 is a sample flowchart of a block diagram of an exemplary method of placing an automatic hold on a depositor's account using the apparatus.

FIG. 7 is a sample flowchart of a block diagram of an exemplary method 700 of placing an automatic hold on a depositor's account using the apparatus 100. Depositor will similarly need to activate the check transaction manger device 100 (step 702) and may find it advantageous to first obtain his/her account balance. As such, method 700 may proceed to authenticate depositor and obtain his/her balance by performing steps 704 through step 718, which are identical to steps 604-step 618 of FIG. 6.

Additionally, apparatus 100 may display instructions for entering the check information (step 720) for which the funds are to be held, e.g. "Input the new check number." Apparatus 100 receives the new check number (step 722) inputted by depositor and receives the amount to be paid (step 724), where the check amount will be validated, i.e. the check amount does not exceed the available balance, or represents the correct amount intended by the depositor. If the check amount is valid (step 726), i.e. apparatus 100 places an automatic hold (step 728) on the depositor's account such that sufficient funds will be payable for the check when tendered to the banking institution 202 for payment.

However, if the check amount is invalid (step 726) depositor has the option of returning to step 724 to enter a valid check amount before proceeding further. It is understood that depositor may terminate method 700 as well as any of the other methods 400, 500 described herein by deactivating the apparatus 100 at anytime using the activation button 116.

Figure 8:
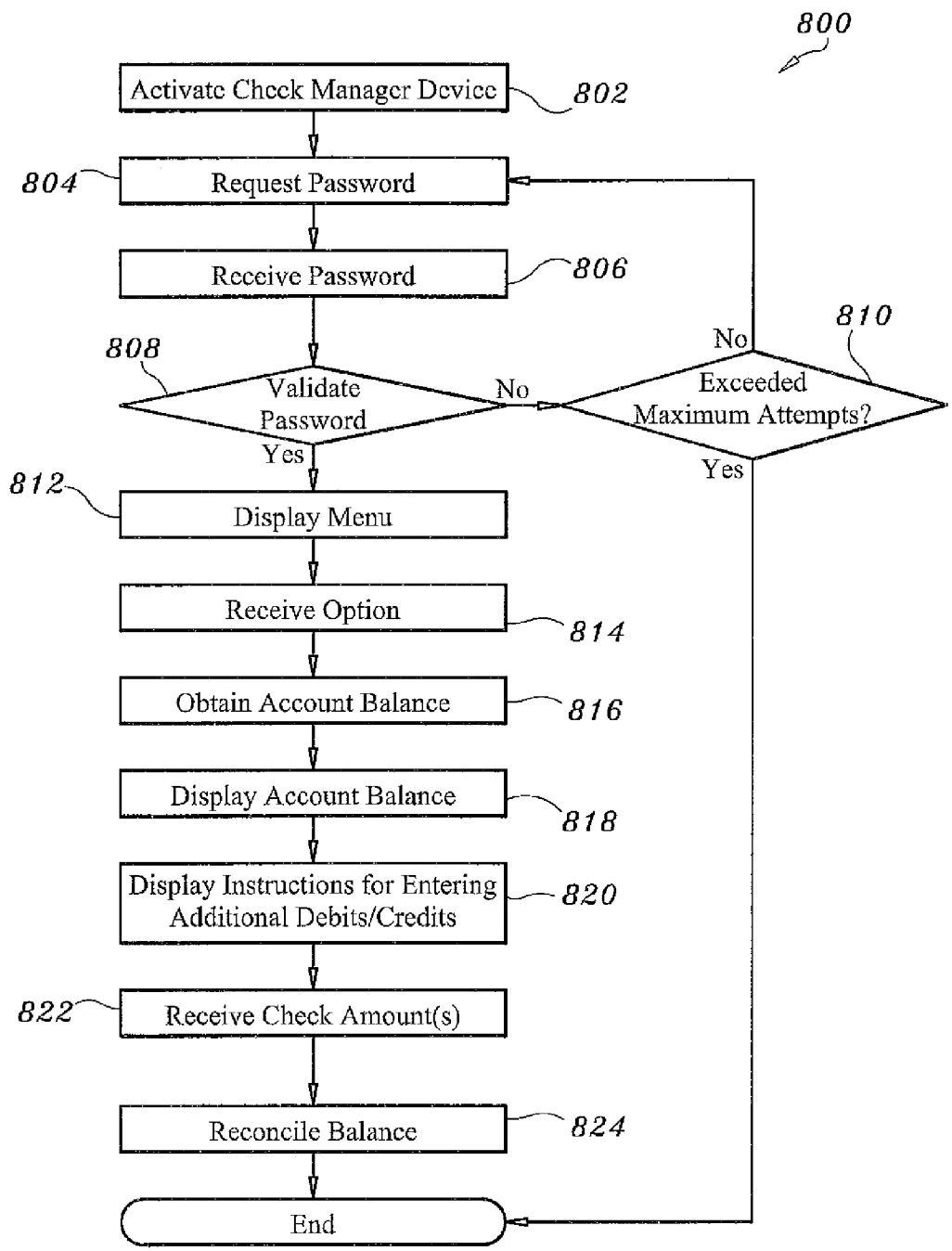
FIG. 8 is a sample flowchart of a block diagram of an exemplary method of reconciling a depositor's account using the apparatus.

FIG. 8 is a sample flowchart of a block diagram of an exemplary method 800 of reconciling a depositor's account using the apparatus 100. Similar to FIGS. 6 & 7, prior to reconciling the depositor's account, depositor may first obtain his/her account balance. As such, method 800 may proceed from step 802 through 818, which are identical to steps 602-618 and steps 702-718 of FIGS. 6 and 7, respectively.

Apparatus 100 may display instructions requiring depositor to enter additional debits or credits (step 820) to the apparatus 100, for which depositor may input for example, an amount for newly written check chargeable to depositor's at least one account, and/or withdrawals not yet posted to the account if applicable. Apparatus 100 receives the check amounts(s) (step 822) and reconciles the account balance (step 824) such that the depositor now has an accurate value of his/her available account balance.

Hardware and Operating Environment

This section provides an overview of example hardware and the operating environments in conjunction with which embodiments of the inventive subject matter can be implemented.

A software program may be launched from a computer readable medium in a computer-based system 200 to execute the functions defined in the software program. Various programming languages may be employed to create software programs designed to implement and perform the methods 400, 500, 600, 700, 800 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 9 below.

Figure 9:
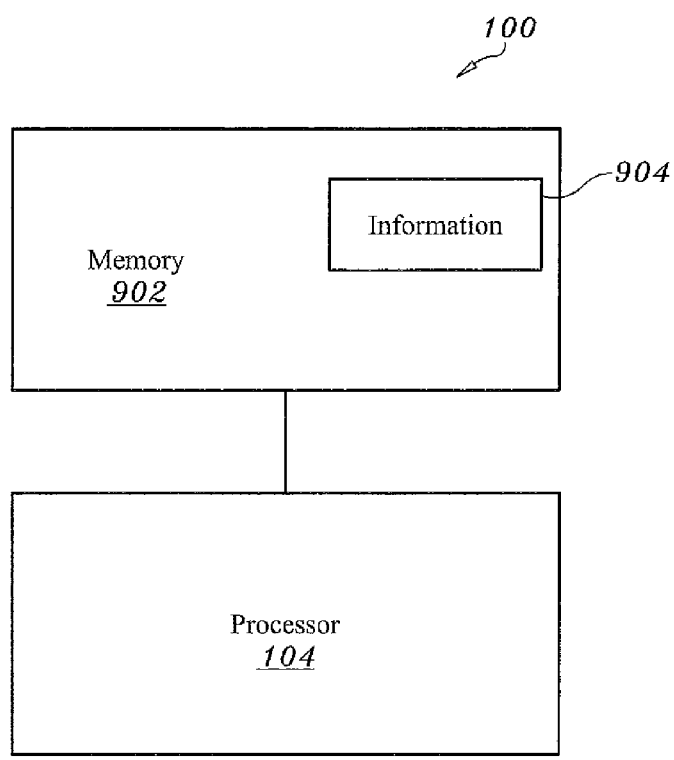
FIG. 9 is a block diagram representing an apparatus according to various embodiments.

FIG. 9 is a block diagram representing an apparatus 100 according to various embodiments. Such embodiments may comprise a computer, a memory system, a magnetic or optical disk, some other storage device, or any type of electronic device or system. The apparatus 100 may include one or more processor(s) 104 coupled to a machine-accessible medium such as a memory 902 (e.g., a memory including electrical, optical, or electromagnetic elements). The medium may contain associated information 904 (e.g., computer program instructions, data, or both) which, when accessed, results in a machine (e.g., the processor(s) 104) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An apparatus comprising of:
    a check transaction manager device that includes a self-contained non-electronic detachable writing assembly with a marking element positioned within, wherein the check transaction manager device enables access to at least one depositor's account at an issuing banking institution;
    an electronic elongated member detachably affixed to the self-contained non-electronic detachable writing assembly, which includes:
        programmable keys positioned thereon used to input communication commands for communicating with the issuing banking institution over a closed network wirelessly, incorporating in the check transaction manager device's communications the at least one depositor's account information as inputted using the programmable keys; and
        at least one processor positioned within the electronic elongated member of the check transaction manager device,
        wherein the detachable writing assembly includes at least one aperture at the detachable assembly's upper portion which is configured to receive a tapered end of the electronic elongated member.

2. The apparatus of claim 1, wherein the check transaction manager device is configured for storing thereon any one or more of the following: unique identifier, apparatus' encryption key, depositor's account information; date and time stamp for last access, apparatus' electronic password key and depositor's biometric identifier.

3. The apparatus of claim 1, wherein the check transaction manager device comprises of biometric verification means which includes the at least one processor disposed in communication with any one of the following: fingerprint recognition scanner, hand geometry recognition scanner, palm geometry recognition scanner, iris scanner, retina recognition scanner, or an audio receiving circuit capable of receiving audio signals at predetermined frequencies and/or with additional hardware complete with electronic circuitry for speech recognition.

4. The apparatus of claim 1, wherein the marking element comprises of any one of the following: a pencil's lead, a ballpoint pen's assembly, or marker's felt.

5. The apparatus of claim 1, further comprising of display means positioned thereon which includes any one of the following: a liquid crystal display screen, a light emitting diode screen, or a monitor.

6. The apparatus of claim 1, wherein the check transaction manager device includes at least one communications means for transmitting or receiving depositor's account information via a wireless protocol.

7. The apparatus of claim 6, wherein the at least one communications means comprises of any one or more of the following: a receiver, a transmitter, a transceiver, a positioning system receiver, a wireless modem, a global system for mobile communications modem.

8. The apparatus of claim 1, wherein the at least one depositor's account information includes any one or more of the following: check transaction manager device's identification number, encryption key for issued check transaction manager device; depositor's name, depositor's address; depositor's at least one account number, depositor's password, at least one account balance, at least one banking institution's routing number, apparatus' password key, at least one check number, amount for at least one check, name of issuing banking institution, available check ranges, signatories for the at least one account, and accounts linked to apparatus.

9. The apparatus of claim 1, wherein the check transaction manager device includes a verifiable unique identifier.

10. The apparatus of claim 1, wherein the closed network comprises of a direct link to the issuing banking institution's computer without using the Internet or another browser application.

11. The apparatus of claim 1, wherein the check transaction manager device includes securing means for securing the check transaction manger device to an article of clothing.

12. A system comprising of:
    a check transaction manager device that includes a self-contained non-electronic detachable writing assembly with a marking element positioned within, wherein the check transaction manager device enables access to at least one depositor's account at the issuing banking institution;
    an electronic elongated member detachably affixed to the self-contained non-electronic detachable writing assembly, which includes:
    programmable keys positioned thereon used to input communication commands for communicating with the issuing banking institution over a closed network wirelessly incorporating in the checking transaction manager device's communications the at least one depositor's account information as inputted using the programmable keys;
    at least one processor positioned within the electronic elongated member of the check transaction manager device; and
    computer executable instructions executable by the at least one processor, wherein the detachable writing assembly includes at least one aperture at the detachable assembly's upper portion which is configured to receive a tapered end of the electronic elongated member.

13. The system of claim 12, wherein the check transaction manager device is configured for storing thereon a biometric identifier.

14. The system of claim 12, wherein the check transaction manager device comprises of biometric verification means which includes the at least one processor disposed in communication with any one of the following: fingerprint recognition scanner, hand geometry recognition scanner, palm geometry recognition scanner, iris scanner, retina recognition scanner, or an audio receiving circuit capable of receiving audio signals at predetermined frequencies and/or with additional hardware complete with electronic circuitry for speech recognition.

15. The system of claim 12, wherein the marking element comprises of any one of the following: a pencil's lead, a ballpoint pen's assembly, or marker's felt.

16. The system of claim 12, wherein the computer executable instructions executable by the at least one processor are operative to perform any one or more of the following:

verify authenticity of the check transaction manager device as being issued by the issuing banking institution;
reconcile the at least one depositor's account;
confirm depositor's account balance;
place automatic holds against available funds in the at least one depositor's account;
electronically store a biometric identifier on the check transaction manager device; and
validate a biometric sample with a biometric identifier stored on the check transaction manager device.

17. The system of claim 12, comprising of the at least one processor in communication with at least one display means for displaying thereon at least one depositor's account information.

18. The system of claim 12, further comprising:
the at least one processor; and
at least one communication means in communication with the at least one processor, where the communication means is configured for transmitting or receiving at least one depositor's account information from the issuing banking institution.

19. The system of claim 12, wherein the at least one communications means includes the at least one processor in communication with any one or more of the following: a receiver, a transmitter, a transceiver, a positioning system receiver, a wireless modem, a global system for mobile communications modem.

20. The system of claim 12, wherein the at least one depositor's account information includes any one or more of the following: check transaction manager device's identification number, encryption key for issued check transaction manager device; depositor's name, depositor's address; depositor's at least one account number, depositor's password, at least one account balance, at least one banking institution's routing number, an apparatus' password key, at least one check number, amount for at least one check, name of issuing banking institution, available check ranges, signatories for the at least one account, and accounts linked to apparatus.

21. The system of claim 12, wherein the programmable keys are configured for activating the check transaction manager device to authorize connectivity to at least one depositor's account at the issuing banking institution.

22. The apparatus of claim 1, wherein the electronic elongated member is detachably affixed to the self-contained non-electronic detachable writing assembly by suction or fastening means.

23. The apparatus of claim 22, wherein fastening means include any one or more of the following: thread, glue, snaps, or a plurality of monofilament hoops and loops.

24. The system of claim 12, wherein the electronic elongated member is detachably affixed to the self-contained non-electronic detachable writing assembly by suction or fastening means.

25. The system of claim 24, wherein fastening means include any one or more of the following: thread, glue, snaps, or a plurality of monofilament hoops and loops.

26. The apparatus of claim 1, wherein the programmable keys positioned are used to input the at least one depositor's account information when communicating with the issuing banking institution over a closed network.

27. The system of claim 12, wherein the programmable keys positioned are used to input the at least one depositor's account information when communicating with the issuing banking institution over a closed network.

* * * * *